United States Patent
Hiroshima et al.

(10) Patent No.: US 9,655,341 B2
(45) Date of Patent: May 23, 2017

(54) ANIMAL TOILET SAND

(71) Applicant: UNICHARM CORPORATION, Ehime (JP)

(72) Inventors: Kenji Hiroshima, Kagawa (JP); Shinya Kaneko, Kagawa (JP); Takeshi Ikegami, Kagawa (JP)

(73) Assignee: Unicharm Corporation, Ehime (JP)

( * ) Notice: Subject to any disclaimer, the term of this patent is extended or adjusted under 35 U.S.C. 154(b) by 56 days.

(21) Appl. No.: 14/405,433

(22) PCT Filed: Apr. 30, 2013

(86) PCT No.: PCT/JP2013/062676
§ 371 (c)(1),
(2) Date: Dec. 4, 2014

(87) PCT Pub. No.: WO2013/183390
PCT Pub. Date: Dec. 12, 2013

(65) Prior Publication Data
US 2015/0181833 A1    Jul. 2, 2015

(30) Foreign Application Priority Data
Jun. 6, 2012 (JP) .................. 2012-128910

(51) Int. Cl.
*A01K 29/00* (2006.01)
*A01K 1/015* (2006.01)

(52) U.S. Cl.
CPC .......... *A01K 1/0155* (2013.01); *A01K 1/0154* (2013.01)

(58) Field of Classification Search
CPC ... A01K 1/0152; A01K 1/0154; A01K 1/0155
See application file for complete search history.

(56) References Cited

U.S. PATENT DOCUMENTS 5,000,115 A * 3/1991 Hughes ................ A01K 1/0154
119/173
5,609,123 A * 3/1997 Luke .................... A01K 1/0154
119/173
(Continued)

FOREIGN PATENT DOCUMENTS

JP    1-312945    12/1989
JP    11-32607    2/1999
(Continued)

OTHER PUBLICATIONS

European extended Search Report from corresponding European application No. 13800419.7 dated Jan. 4, 2016 (7 pgs).
(Continued)

*Primary Examiner* — Leslie A Nicholson, III
*Assistant Examiner* — Kimberley S Wright
(74) *Attorney, Agent, or Firm* — Brinks Gilson & Lione

(57) ABSTRACT

To provide animal toilet sand that can prevent an aggregate from growing depth-wise upon absorption of liquid such as urine, and can suppress scattering. An animal toilet sand composed of a plurality of particulates mainly composed of bentonite, wherein: the particulates include smaller diameter particulates of at least 0.8 mm and no greater than 2 mm in grain size, and larger diameter particulates of at least 2 mm and no greater than 10 mm in grain size; and the particulates include the smaller diameter particulates in a range of at least 20% and no greater than 100% of the larger diameter particulates in ratio by weight. In addition, it is preferable that the proportion of the smaller diameter particulates and the larger diameter particulates with respect to the animal toilet sand is at least 90% in ratio by weight.

7 Claims, 1 Drawing Sheet

(56) References Cited

U.S. PATENT DOCUMENTS

| | | | | |
|---|---|---|---|---|
| 5,975,019 A * | 11/1999 | Goss | ............. | A01K 1/0154 |
| | | | | 119/173 |
| 6,053,125 A * | 4/2000 | Kory | ............. | A01K 1/0155 |
| | | | | 119/171 |
| 6,523,496 B1 * | 2/2003 | Keithly | ............. | A01K 1/0155 |
| | | | | 119/171 |
| 6,962,129 B1 * | 11/2005 | Lawson | ............. | A01K 1/0152 |
| | | | | 119/173 |
| 7,228,819 B1 * | 6/2007 | Wang | ............. | A01K 1/0152 |
| | | | | 119/171 |
| 8,418,652 B1 * | 4/2013 | Mallard | ............. | A01K 1/0154 |
| | | | | 119/171 |
| 8,765,010 B2 * | 7/2014 | Boote | ............. | B01J 20/24 |
| | | | | 119/171 |
| 8,795,551 B2 * | 8/2014 | Ito | ............. | A01K 1/0152 |
| | | | | 252/194 |
| 2004/0079293 A1 * | 4/2004 | Rasner | ............. | A01K 1/0152 |
| | | | | 119/172 |
| 2007/0065397 A1 * | 3/2007 | Ito | ............. | A01K 1/0152 |
| | | | | 424/76.2 |
| 2007/0289543 A1 * | 12/2007 | Petska | ............. | A01K 1/0154 |
| | | | | 119/173 |
| 2008/0022940 A1 * | 1/2008 | Kirsch | ............. | A01K 1/0152 |
| | | | | 119/173 |
| 2008/0251027 A1 * | 10/2008 | Kirsch | ............. | A01K 1/0152 |
| | | | | 119/173 |
| 2009/0038554 A1 | 2/2009 | Tsutsumi et al. | | |
| 2009/0217882 A1 * | 9/2009 | Jenkins | ............. | A01K 1/0152 |
| | | | | 119/173 |
| 2010/0132619 A1 * | 6/2010 | Falcone | ............. | A01K 1/0152 |
| | | | | 119/173 |
| 2014/0069344 A1 * | 3/2014 | Lipscomb | ............. | A01K 1/0107 |
| | | | | 119/171 |
| 2014/0190420 A1 * | 7/2014 | Ito | ............. | A01K 1/0152 |
| | | | | 119/172 |
| 2015/0107524 A1 * | 4/2015 | Hiroshima | ............. | A01K 1/0152 |
| | | | | 119/171 |
| 2015/0181834 A1 * | 7/2015 | Lipscomb | ............. | A01K 1/0155 |
| | | | | 119/171 |

FOREIGN PATENT DOCUMENTS

| | | |
|---|---|---|
| JP | H11-220966 A | 8/1999 |
| JP | 2001-95410 A | 4/2001 |
| JP | 2004-73053 A | 3/2004 |
| JP | 2009-87 A | 1/2009 |
| JP | 2010-247013 A | 11/2010 |

OTHER PUBLICATIONS

International Search Report from corresponding PCT application No. PCT/JP2013/062676 dated Jul. 23, 2013 (4 pgs).

Japanese Office Action from corresponding Japanese application No. 2012-128910 dated Feb. 23, 2016 (2 pgs).

* cited by examiner

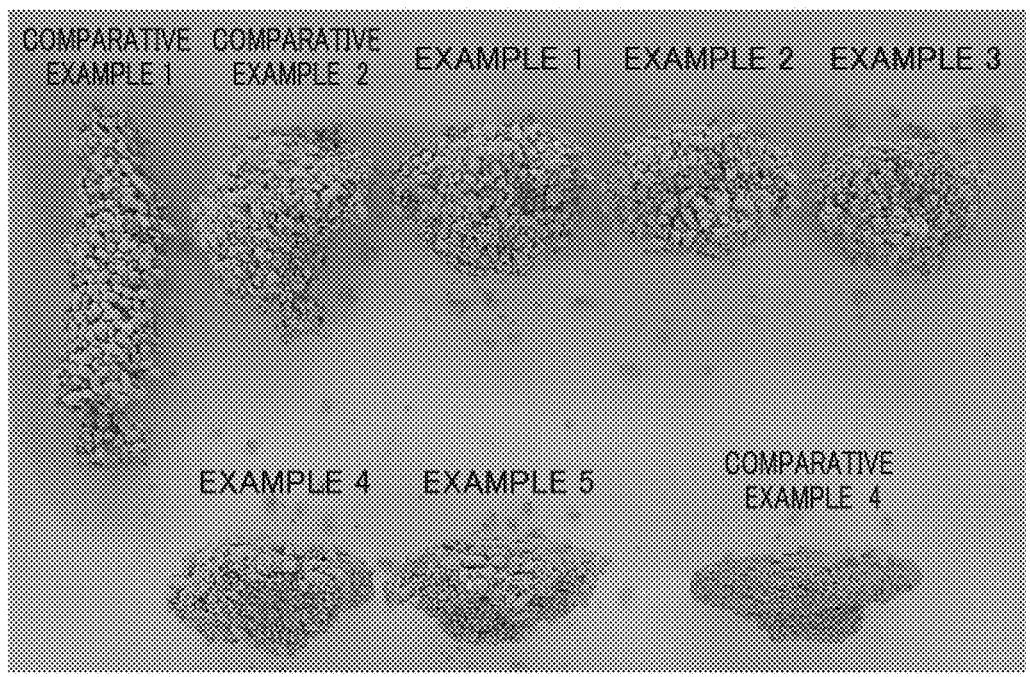

ANIMAL TOILET SAND

RELATED APPLICATION

This application is a 35 U.S.C. §371 national phase filing of International Patent Application No. PCT/JP2013/062676 filed Apr. 30, 2013, to which priority is claimed under 35 U.S.C. §120 and through which priority is claimed under 35 U.S.C. §119 to Japanese Patent Application No. 2012-128910, filed Jun. 6, 2012.

TECHNICAL FIELD

The present invention relates to animal toilet sand. More specifically, the present invention relates to animal toilet sand mainly composed of bentonite to absorb and solidify liquid such as urine.

BACKGROUND ART

Conventionally, a toilet for animals such as dogs and cats kept as pets is provided with a box-like toilet sand container with an open upper part and animal toilet sand contained in the toilet sand container. In addition, a technique of using particulates mainly composed of bentonite, which swells and becomes adhesive upon absorbing liquid, as animal toilet sand has also been proposed (for example, refer to Patent Document 1).

By using particulates mainly composed of bentonite as animal toilet sand, the particulates, which have absorbed excreted urine, swell and stick together to form an aggregate. As a result, an owner of a pet can easily remove dirty particulates contaminated with urine by removing the aggregate of the particulates, and can maintain the animal toilet sand in a preferred sanitary state.

Patent Document 1: Japanese Unexamined Patent Application Publication No. H1-312945

DISCLOSURE OF THE INVENTION

Problems to be Solved by the Invention

The toilet sand container is lined with animal toilet sand approximately 5 cm in depth, for example, in order to allow sufficient absorption of the pet's excretion.

Here, by increasing the grain size of the particulates constituting the animal toilet sand, the excreted urine is allowed to quickly soak downwards and can be prevented from remaining on the surface of the animal toilet sand that has been laid out. However, if the excreted urine soaks down too much, the aggregate of the particulates is elongated in the direction of depth, making it difficult to remove. In addition, if excreted urine reaches the bottom face of the toilet sand container without being absorbed by the particulates, the urine spreads in a planar direction at the bottom face of the toilet sand container and contaminates the toilet sand container. The aggregate of the particulates that is in a form spread out in a planar direction in the vicinity of the bottom face of the toilet sand container is difficult to remove.

Meanwhile, in a case in which the grain size of the particulates constituting the animal toilet sand is reduced, urine can be prevented from soaking too much downwards; however, the particulates are easily scattered when the toilet sand box is lined with the animal toilet sand and when a pet agitates the animal toilet sand with its back paws.

Given this, the present invention is aimed at providing animal toilet sand that can prevent an aggregate from growing depth-wise upon absorption of liquid such as urine, and can suppress scattering.

Means for Solving the Problems

The present invention relates to animal toilet sand composed of a plurality of particulates having a water absorbing property, wherein: the particulates include smaller diameter particulates of at least 0.8 mm and no greater than 2 mm in grain size, and larger diameter particulates of at least 2 mm and no greater than 10 mm in grain size; and the particulates include the smaller diameter particulates in a range of at least 20% and no greater than 100% of the larger diameter particulates in ratio by weight.

In addition, it is preferable that proportion of the smaller diameter particulates and the larger diameter particulates with respect to the animal toilet sand is at least 90% in ratio by weight.

In addition, it is preferable that the larger diameter particulates are particulates granulated to have a columnar shape.

In addition, it is preferable that the ratio by weight of the smaller diameter particulates to the larger diameter particulates is at least 25% and no greater than 45%.

Effects of the Invention

According to the animal toilet sand of the present invention, an aggregate can be prevented from growing depth-wise upon absorption of liquid such as urine, and scattering can be suppressed.

BRIEF DESCRIPTION OF THE DRAWINGS

FIG. 1 is a diagram illustrating solidified states of the animal toilet sand according to Examples and Comparative Examples.

PREFERRED MODE FOR CARRYING OUT THE INVENTION

A preferred embodiment of the animal toilet sand of the present invention is described hereinafter.

Animal toilet sand of the present embodiment is mainly constituted of a plurality of particulates mainly composed of bentonite.

As particulates having bentonite as a principal raw material, it is possible to use particulates obtained by crushing bentonite raw ore using a Raymond mill or the like and then chamfering, and particulates obtained by granulating a material including pulverized bentonite as a main component and mixing other ingredients.

In a case where the particulates are composed of granulated matter, a fragrance, an antimicrobial agent and the like can be used as the other ingredients.

Alcohols such as geraniol, citronellol, citral, eugenol, phenethyl alcohol, thymol, linalool, leaf alcohol, menthol, benzyl alcohol and the like, and aldehydes such as hexylcinnamaldehyde and the like, are preferably used as the fragrance. By employing these fragrances, the odor of excreted urine and feces can be suppressed.

As the antimicrobial agent, organic, inorganic-metal, photocatalytic, and natural antimicrobial agents can be used; however, an organic surfactant type antimicrobial agent can preferably be used. By employing these antimicrobial agents, propagation of bacteria and the like can be suppressed.

The content of the other ingredients in the particulates is preferably no greater than 30%, and more preferably no greater than 20%, from the viewpoint of maintaining a preferable stickiness of the particulates when urine is absorbed.

In addition, it is preferable that the granulated matter includes sodium carbonate ($Na_2CO_3$) along with the other ingredients. Sodium carbonate is added in order to improve the solidifying property of bentonite. The amount of sodium carbonate added is preferably 0.1% to 3% with respect to the weight of bentonite.

In a case in which the particulates are composed of granulated matter, the particulates may be granulated by means of a disk pelleter, a briquette machine, a tableting machine, or the like.

In the present invention, the plurality of particulates includes smaller diameter particulates and larger diameter particulates.

In the present specification, the smaller diameter particulate indicates a particulate of at least 0.8 mm and less than 2 mm in grain size. The larger diameter particulate indicates a particulate of at least 2 mm and less than 10 mm in grain size.

In the present specification, particulates that pass through a sieve of 2 mm mesh and do not pass through a sieve of 0.8 mm mesh are regarded as the smaller diameter particulates. Meanwhile, particulates that pass through a sieve of 10 mm mesh and do not pass through a sieve of 2 mm mesh are regarded as the larger diameter particulates.

In the present invention, the animal toilet sand includes the smaller diameter particulates in a ratio by weight of at least 20%, preferably at least 25%, to the larger diameter particulates. As a result, the smaller diameter particulates are adequately arranged in gaps formed between the larger diameter particulates, and urine excreted on the surface of the animal toilet sand soaks downwards while diffusing in a planar direction. Given this, depth of the aggregation generated by the particulates swelling and sticking after absorbing urine can be reduced.

In addition, since the aggregate is formed in a state in which the smaller diameter particulates are arranged between the larger diameter particulates, the surface of the aggregate thus formed becomes smooth. Here, since the aggregate is to be removed by a scoop, the surface of the aggregate being smooth can prevent the surface of the aggregate from breaking or stripping away.

In addition, the ratio by weight of the smaller diameter particulates to the larger diameter particulates is no greater than 100%, preferably no greater than 70%, more preferably no greater than 45%, and most preferably no greater than 33%. By making the ratio by weight of the smaller diameter particulates to the larger diameter particulates to be no greater than 100%, urine can be prevented from remaining on the surface of the animal toilet sand. In addition, scattering of the animal toilet sand can be suppressed.

In other words, from the viewpoint of reducing the depth of the aggregate while suppressing scattering of the animal toilet sand, the animal toilet sand includes the smaller diameter particulates in a ratio by weight in a range of: at least 20% and no greater than 100%; preferably at least 25% and no greater than 70%; more preferably at least 25% and no greater than 45%; and most preferably at least 25% and no greater than 33% to the larger diameter particulates.

Furthermore, in the animal toilet sand, the proportion of the smaller diameter particulates and the larger diameter particulates with respect to all the particulates is preferably at least 90% and more preferably at least 95% in ratio by weight. By making the proportion of the smaller diameter particulates and the larger diameter particulates with respect to all the particulates at least 90%, the content of particulates larger than the larger diameter particulates and particulates smaller than the smaller diameter particulates can be reduced. As a result, the aggregate can thus be prevented from growing depth-wise due to the presence of a large amount of particulates larger than the larger diameter particulates; and scattering can thus be prevented from occurring due to the presence of particulates smaller than the smaller diameter particulates.

In addition, the animal toilet sand can include particulates composed mainly of other material in addition to the particulates composed mainly of bentonite. The other material may be a porous material such as activated charcoal, silica gel, zeolite and the like having a deodorant effect and/or a moisture adjusting effect, as well as citric acid, sodium bicarbonate, a surfactant and the like having a neutralizing effect. The particulates can be configured by including a bactericide, an antibacterial agent, a bacteriostatic agent, and a fragrance in the other material.

The content of the particulates composed mainly of the other material in the animal toilet sand is preferably no greater than 10% and more preferably no greater than 5% in ratio by weight.

In addition, in the present invention, the shape of the particulates is not particularly limited and can be a spherical shape, a columnar shape and the like; however, it is preferable that the larger diameter particulates are particulates granulated to have a columnar shape. By composing the larger diameter particulates with particulates granulated to have a columnar shape, appropriate gaps can be generated between the large diameter particulates, the gaps allowing preferable arrangement of the smaller diameter particulates. The depth of the aggregate formed when urine is excreted can thus be stabilized.

EXAMPLES

The present invention is described in further detail hereinafter with reference to Examples. However, the scope of the present invention is not limited to the examples.

Manufacture of Particulates 1.5% by mass of sodium carbonate was added to bentonite raw ore (produced by Nihon Kouken K.K.) and dry ground bentonite (produced by Nihon Kouken K.K., trade name: Tsugaru No. 2), water was added thereto to have moisture percentage upon granulation of 22%, and blended for 10 minutes.

After mixing, the mixture was granulated by using an extrusion granulator (manufactured by Dalton Co., Ltd., trade name: F-5) (screen thickness: 3 mm, φ2.5 mm) and dried by a drier to have moisture content no greater than 2%, to obtain particulates.

The particulates thus obtained were classified such that particulates that pass through a sieve of 10 mm mesh and do not pass through a sieve of 2 mm mesh were classified as the larger diameter particulates.

Meanwhile, the particulates thus obtained were roughly crushed by using a crusher (flash mill or hammer mill) and then classified by using a vibration sieve machine to obtain the smaller diameter particulates. More specifically, particulates that pass through a sieve of 2 mm mesh and do not pass through a sieve of 0.8 mm mesh were classified as the smaller diameter particulates.

The smaller diameter particulates and the larger diameter particulates thus obtained were mixed in the proportions shown in Table 1 below, to thereby obtain the animal toilet sands of Examples 1 to 6 and Comparative Examples 1 to 4.

TABLE 1

|  | LARGER DIAMETER PARTICULATES (%) | SMALLER DIAMETER PARTICULATES (%) | RATIO BY WEIGHT (%) (SMALLER/LARGER) |
|---|---|---|---|
| Comparative Example 1 | 100 | 0 | 0 |
| Comparative Example 2 | 85 | 15 | 18 |
| Example 1 | 80 | 20 | 25 |
| Example 2 | 75 | 25 | 33 |
| Example 3 | 65 | 35 | 54 |
| Example 4 | 60 | 40 | 67 |
| Example 5 | 55 | 45 | 82 |
| Example 6 | 50 | 50 | 100 |
| Comparative Example 3 | 45 | 55 | 122 |
| Comparative Example 4 | 0 | 100 | ∞ |

Solidification depth and strip-away rate were measured and scattering was determined for the animal toilet sands of Examples 1 to 6 and Comparative Examples 1 to 4 thus obtained. The results are shown in Table 2 below.

Measurement of Solidification Depth

The animal toilet sands of Examples 1 to 6 and Comparative Examples 1 to 4 are each contained in beakers to a depth of at least 10 cm.

Next, 20 ml of a normal saline solution (0.9% NaCl aq) at 22° C. is added as artificial urine in drops for 10 seconds to the beakers with the animal toilet sands, from a position of 3 cm above the upper surface of the animal toilet sand.

10 minutes after addition of the artificial urine, the depth of an aggregate obtained was measured. The depth of the aggregate was evaluated as follows: a "double circle" is shown for a case of less than 50 mm; a "circle" for a case of at least 50 mm and less than 70 mm; and an "x" for a case of at least 70 mm.

Solidified states of the animal toilet sand according to Examples 1 to 5 and Comparative Examples 1, 2, and 4 are shown in FIG. 1.

Measurement of Strip-Away Rate

The aggregate obtained in the above described measurement of solidification depth was taken by a scoop, agitated laterally for 10 seconds, and the stripped-away particulates were weighed. The strip-away rate was obtained by dividing the weight of the stripped-away particulates by the weight of the aggregate before agitation. The strip-away rate was evaluated as follows: a "double circle" is shown for a case of less than 5%; a "circle" for a case of at least 5% and less than 10%; and an "x" for a case of at least 10%.

Evaluation of Scattering 10 g of each of the animal toilet sands of Examples 1 to 6 and Comparative Examples 1 to 4 was freely dropped onto a flat plate from a height of 50 cm, and the state of the scattered animal toilet sands was visually evaluated. The evaluation was made by 10 cat owners, and the state of the scattered animal toilet sands was evaluated as follows: a "double circle" is shown for a case in which 8 to 10 cat owners can accept the state; a "circle" for a case in which 4 to 7 cat owners can accept the state; and an "x" for a case in which 0 to 3 cat owners can accept the state.

TABLE 2

|  | SOLIDIFICATION DEPTH | | STRIP-AWAY RATE | | SCATTERING | |
|---|---|---|---|---|---|---|
|  | EVALUATION | mm | EVALUATION | % | EVALUATION | THE NUMBER OF PEAPLE ACCEPTED THE STATE |
| Comparative Example 1 | X | 105 | X | 11.3 | ◎ | 8 |
| Comparative Example 2 | ○ | 60 | X | 10.3 | ◎ | 8 |
| Example 1 | ◎ | 41 | ○ | 9.1 | ◎ | 8 |
| Example 2 | ◎ | 41 | ○ | 8.7 | ◎ | 8 |
| Example 3 | ◎ | 40 | ○ | 5.9 | ○ | 5 |
| Example 4 | ◎ | 32 | ○ | 6.2 | ○ | 5 |
| Example 5 | ◎ | 28 | ○ | 5.4 | ○ | 4 |
| Example 6 | ◎ | 28 | ○ | 6.1 | ○ | 4 |
| Comparative Example 3 | ◎ | 28 | ○ | 5.4 | X | 2 |
| Comparative Example 4 | ◎ | 26 | ◎ | 4.4 | X | 1 |

As shown in Table 2 and FIG. 1, for the animal toilet sands of Examples 1 to 6 and Comparative Examples 3 and 4 with the proportion of the smaller diameter particulates to the larger diameter particulates being at least 20% in ratio by weight, the solidification depths were less than 50 mm and it is indicated that the aggregations generated upon absorption of urine do not grow depth-wise. On the other hand, for the animal toilet sands of Comparative Examples 1 and 2, the solidification depths were at least 50 mm and it is indicated that the aggregations grow depth-wise.

In addition, for the animal toilet sands of Examples 1 to 6 and Comparative Examples 3 and 4, the strip-way rates were less than 10% and it is indicated that the particulates do not easily strip away upon taking up the aggregate with a scoop. On the other hand, for the animal toilet sands of Comparative Examples 1 and 2, the strip-away rates were at least 10% and it is indicated that the particulates easily fall off.

Furthermore, for Examples 1 to 6 and Comparative Examples 1 and 2, a large number of cat owners could accept the scattering of the animal toilet sands and it is indicated that the evaluation is preferable. Furthermore, for Comparative Examples 3 and 4, a large number of cat owners evaluated the scattering of the animal toilet sands as not being acceptable, and it is indicated that the evaluation is poor.

Given the above results, for the animal toilet sands of Examples 1 to 6 with the proportion of the smaller diameter particulates to the larger diameter particulates being at least 20% and no greater than 100% in ratio by weight, it is indicated that the aggregations generated upon absorption of urine are less likely to grow depth-wise and that scattering is less likely to occur. Among these, for the animal toilet sands of Examples 1 to 4 with the proportion of the smaller diameter particulates to the larger diameter particulates being at least 25% and no greater than 70% in ratio by weight, it is indicated that the evaluation regarding scattering is improved; furthermore, for the animal toilet sands of Examples 1 and 2 with the proportion of the smaller diameter particulates to the larger diameter particulates being at least 25% and no greater than 45% in ratio by weight, it is indicated that the evaluation regarding both of solidification depth and scattering is particularly high.

The invention claimed is:

1. Animal toilet sand composed of a plurality of particulates mainly composed of bentonite,
   wherein: the particulates include smaller diameter particulates of at least 0.8 mm and no greater than 2 mm in grain size, and larger diameter particulates of at least 2 mm and no greater than 10 mm in grain size;
   both the smaller diameter particulates and the larger diameter particulates comprise sodium bentonite that is mainly composed of bentonite that is mixed with a fragrance and an antimicrobial agent;
   the larger diameter particulates are particulates granulated to have a columnar shape so that gaps can be generated between the large diameter particulates, the gaps allowing arrangement of the smaller diameter particulates within the gaps; and
   the particulates include the smaller diameter particulates in a range of at least 25% and no greater than 45% of the larger diameter particulates in ratio by weight.

2. The animal toilet sand according to claim 1, wherein the proportion of the smaller diameter particulates and the larger diameter particulates with respect to the animal toilet sand is at least 90% in ratio by weight.

3. The animal toilet sand according to claim 1, wherein ratio by weight of the smaller diameter particulates to the larger diameter particulates is at least 25% and no greater than 33%.

4. Animal toilet sand composed of a plurality of particulates mainly composed of bentonite,
   wherein: the particulates include sodium carbonate ($Na_2CO_3$) by adding at least $Na_2CO_3$ therein, the particulates include smaller diameter particulates of at least 0.8 mm and no greater than 2 mm in grain size, and larger diameter particulates of at least 2 mm and no greater than 10 mm in grain size
   both the smaller diameter particulates and the larger diameter particulates comprise sodium bentonite that is mainly composed of bentonite that is mixed with a fragrance and an antimicrobial agent;
   the larger diameter particulates are particulates granulated to have a columnar shape so that gaps can be generated between the large diameter particulates, the gaps allowing arrangement of the smaller diameter particulates within the gaps; and
   the particulates include the smaller diameter particulates in a range of at least 25% and no greater than 45% of the larger diameter particulates in ratio by weight.

5. The animal toilet sand according to claim 4, wherein the proportion of the smaller diameter particulates and the larger diameter particulates with respect to the animal toilet sand is at least 90% in ratio by weight.

6. The animal toilet sand according to claim 4, wherein ratio by weight of the smaller diameter particulates to the larger diameter particulates is at least 25% and no greater than 33%.

7. The animal toilet sand according to claim 4, wherein the amount of sodium carbonate added is 0.1% to 3% with respect to the weight of bentonite.

* * * * *